United States Patent [19]

Steiger et al.

[11] Patent Number: 4,520,254

[45] Date of Patent: May 28, 1985

[54] METHOD AND APPARATUS FOR THE ADJUSTMENT OF CONTACT SPRINGS IN A RELAY

[75] Inventors: Erwin Steiger; Bernhard Hering, both of Munich, Fed. Rep. of Germany

[73] Assignee: Siemens Aktiengesellschaft, Berlin and Munich, Fed. Rep. of Germany

[21] Appl. No.: 535,454

[22] Filed: Sep. 23, 1983

[30] Foreign Application Priority Data

Sep. 27, 1982 [DE] Fed. Rep. of Germany ....... 3235714

[51] Int. Cl.³ .............................................. B23K 27/00
[52] U.S. Cl. ........................ 219/121 L; 219/121 LM;
219/121 LQ; 219/121 LS
[58] Field of Search .... 219/121 L, 121 LM, 121 LA,
219/121 LB, 121 LQ, 121 LP, 121 LW, 121
LU, 121 LS, 121 LZ; 335/86, 79, 202

[56] References Cited

U.S. PATENT DOCUMENTS 4,182,998 1/1980 Mueller et al. .................... 335/86 X
4,195,276 3/1980 Rauterberg ....................... 335/86 X

FOREIGN PATENT DOCUMENTS 2624121 12/1977 Fed. Rep. of Germany .
2918100 11/1980 Fed. Rep. of Germany .

OTHER PUBLICATIONS

"Modell 685", Jul. 1979.
Laser Markier System Serie MKF 300.00, Aug. 1978.

*Primary Examiner*—C. L. Albritton
*Attorney, Agent, or Firm*—Mark H. Jay

[57] ABSTRACT

A method and apparatus for adjusting contact springs of a relay with a laser beam. To adjust contact springs a laser beam is trained on specific points of a matrix field on the contact spring that is to be adjusted. For each of the points, the adjustment path that can be produced is stored in a memory. Through determination of the position of the armature or the contact spring by means of an electro-optical device and by comparison of the measurement results with the stored correction values, those points are selected that are to be irradiated with the laser beam.

26 Claims, 11 Drawing Figures

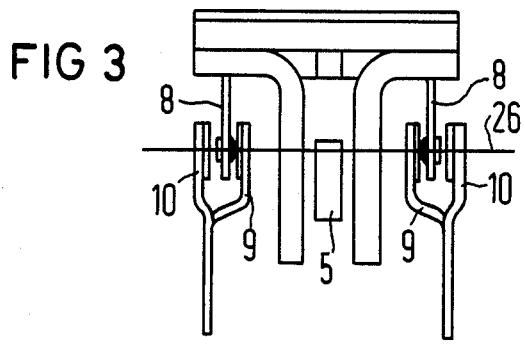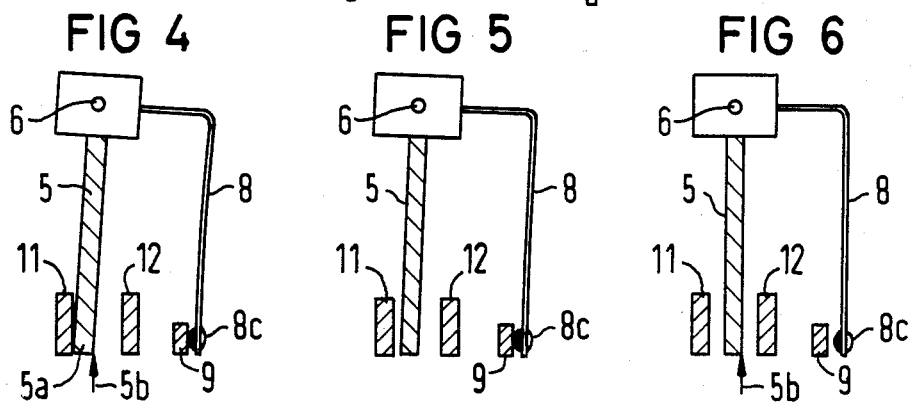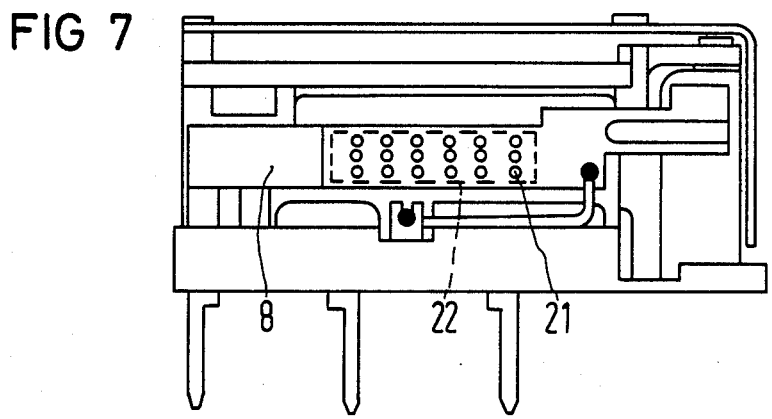

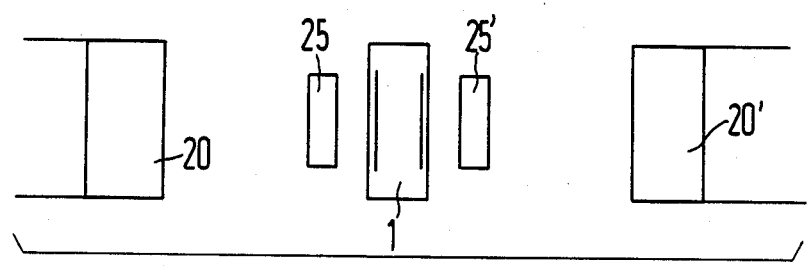
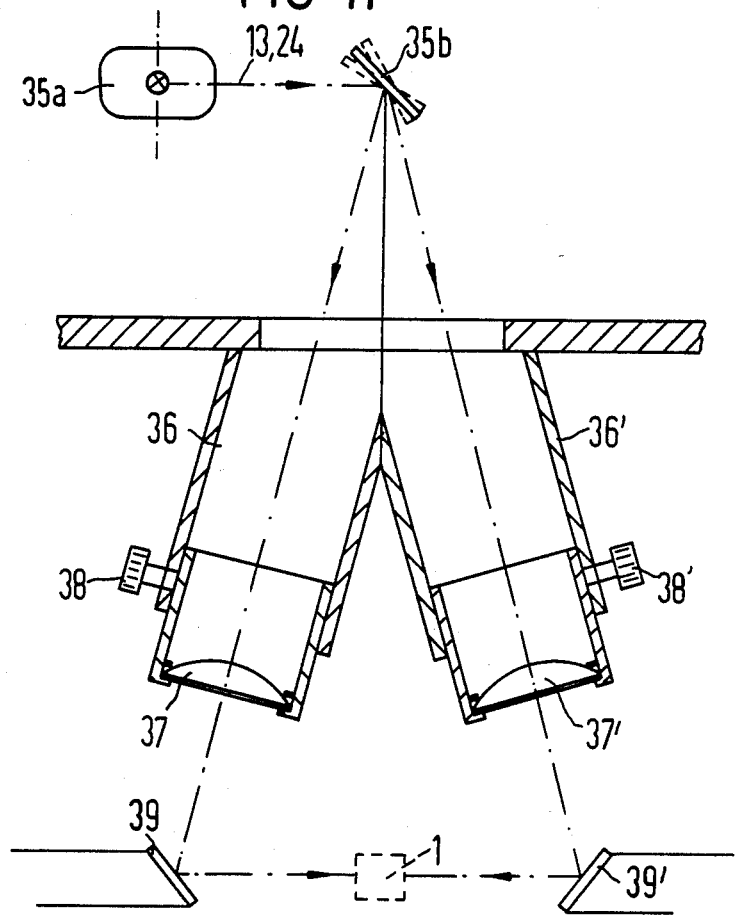

METHOD AND APPARATUS FOR THE ADJUSTMENT OF CONTACT SPRINGS IN A RELAY

BACKGROUND OF THE INVENTION

The invention relates to a method and apparatus for the adjustment of contact springs in a relay. In this invention, by means of a localized, metered application of heat, such as, a laser pulse, a specified adjustment of the position of a contact spring can be achieved.

Published German patent application No. OS 2,918,100 discloses a method of utilizing a laser pulse to produce a specified delay in contact springs or other adjustable parts. The degree of deformation of a spring can be varied by using a laser beam to apply various geometries of the applied fusion zones. Additionally, the use of deflection devices, such as mirrors, can be used for laser beaming.

SUMMARY OF THE INVENTION

The object of the invention is to provide an improved method of accurately adjusting relay contact springs in the fastest and simplest manner possible.

It is a further object of the invention to provide an adjustment method which is suitable for use in the industrial mass production of relays.

It is a further object of this invention to provide apparatus that can be used to accurately adjust relay contact springs in the fastest and simplest manner possible.

It is a still further object of this invention to provide apparatus which can be used to adjust relay contact springs in the industrial mass reproduction of such relays.

In general, the invention features, in one aspect, a method of adjusting contact springs in a relay by the localized application of metered heat from a laser pulse, to produce a specific change in the position of the contact springs, including the steps of: selecting individual points of a matrix field on the surface of a contact spring; irradiating said points with a heat pulse of a predetermined energy, length and focus diameter; obtaining the correction values for the position of a contact spring when said points are irradiated; storing said correction values in a memory; measuring the position of said contact spring in comparison to a desired value; computing the deviation between said measured value and said desired value; comparing said deviation with said stored correction values; selecting those correction values whose resultant most closely corresponds to said deviation; controlling matrix points on said contact spring surface that correspond to said selected correction values; and irradiating said controlled matrix points with a predetermined heat pulse.

In the method according to the invention, completely new and unique irradiation points with their own geometry need not be computed and irradiated for each contact spring according to the desired deformation. Instead a uniform matrix field is provided for all the contact springs relays that are to be adjusted, with every point of this matrix field being capable of irradiation with a heat beam, in particular, a laser beam with a predetermined pulse energy, pulse length and focus diameter. For each point of the matrix field, the correction value that can be obtained is determined in advance and stored for all subsequent adjustment procedures, so that, by means of a comparison of the deviation that is to be corrected with the obtainable correction values in each case, those points of the matrix field whose irradiation with the laser beam gives an optimal approximation of the desired correction can be quickly selected. Since every laser pulse produces a specific angular change at the correspondingly controlled point on the contact spring, the change in the free end of the contact spring, which bears the contact, will be greater, the nearer the irradiated point is to the fixed point of the spring. Therefore, within the matrix field, by the selection and irradiation of various points smaller and larger correction values can be obtained and combined with one another. As a result of the two-dimensional design of the matrix field, it is also possible, if necessary, to produce a deformation of the contact spring around two axes, which is of interest, for example, in the case of bridge contact springs. The reduction of the surface that must be selected for irradiation with a laser pulse, to a relatively small number of individual points of the matrix field permits very rapid selection and control, which is of great advantage for the mass production of relays.

The reproducibility of the change in stroke achieved as a result of the adjustment for each individual matrix point shows a specific range of tolerance, determined, in particular, by the characteristics of the surface of the contact spring in each case. In addition, these tolerance ranges can be additive. Therefore, it is desirable, after the selected points have been irradiated, to measure the position of the contact spring again in comparison with the desired position. Then, if necessary, select further correction values and irradiate the corresponding points on the surface of the contact spring if the deviation exceeds a predetermined tolerance.

The individual points of the matrix field on the surface of the contact spring can be controlled by optical deflection of the energy beam generated by a single heat source. In addition, through the optical deflection of this energy beam, which is typically a laser beam, several contact springs in one relay can be irradiated.

Irradiation of a specific point causes the spring to bend around that point, as long as the spring is not made subject to an initial stress. However, if an initial stress is applied, for example, by placing the spring against an opposite contact, the bending of the spring resulting from irradiating a given point can be intensified, or, if the initial stress is large enough, turned in the opposite direction.

To measure the position of the contact spring it is desirable to use an electro-optical recording device which senses the free end of the spring. In addition, depending on the individual measurement process a functional element of the relay that is subordinate to it, such as the armature, can also be measured. Therefore, in a static measurement process, in which the center position of the armature is determined mechanically, it is possible to sense the center position of a contact spring between two opposite contacts and to measure any deviation from that center position.

It is particularly advantageous to make a dynamic measurement in which the position of the contact spring is determined during a switching operation. In this case the respective position of the armature is determined at the instant a contact is opened or closed. The distance between the armature position at the instant a contact is opened or closed and the final position of the armature is the overtravel. The overtravel determines the contact force. Therefore, the contact spring can be adjusted so the desired amount of overtravel is obtained. It is desirable to illuminate the armature with a flash at the moment of electro-optical recording, in order to achieve a high degree of accuracy with regard to recording the position of the rapidly moving parts.

In position the heat source or the optical deflection device for the laser beam, prior to adjustment, it is advantageous to sense the contour of the contact spring with a light beam in connection with a light receiver. It is desirable to use a second laser for this sensing, which is arranged collinearly to the first laser. The first laser, which generates the heat pulse, radiates substantially more energy than the second laser.

It is also desirable for the contact spring to be of varying thickness. The part that is irradiated should be thicker than the free end that is used to make the contact.

In general, the invention features, in one aspect, apparatus for the adjustment of contact springs in a relay, in which a localized, metered application of heat, in particular by means of a laser pulse, is used to produce a specific change in the position of a contact spring, including a recording device for positioning the relay that is to be adjusted; a measurement device for sensing the position of the armature and the contact spring; an initial comparison device for the comparison of the measured position with the stored desired position, and for the computation of deviation values; a correction value memory to record correction values corresponding to specific points of a matrix; a second comparison device, to which the computed deviation value and the stored correction values are transmitted; means for generating a heat radiation pulse; and means for deflecting said heat radiation pulse, in accordance with the output signals of the second comparison device, at specific points on the contact spring to be adjusted.

The recording device serves to correctly position the relay that is to be adjusted with respect to the measurement device and with respect to the deflection device for the laser beam. The recording device can also be used to control the relay during the measurement procedure, in order to be able to take measurements while the armature is in motion. For this purpose it is preferable for the recording device to have an attachment for making contact with the connection pins of the relay. Voltage can then be applied through a switching device to the excitation winding of the relay, and the measurement device will be triggered by the opening or closing of the contact of the contact spring to be adjusted.

In one embodiment the measurement device is a semiconductor image-recording apparatus, in which an image of the area of the relay that is to be sensed is formed by means of a lens system on a CCD line sensor. In order to increase the light-dark contrast in the static sensing process, it is desirable to provide a light source which is directed by an optical fiber bundle onto the parts of the relay to be sensed. For dynamic measurements, it is desirable to use a stroboscope to produce a flash at the moment of sensing.

The comparison devices and the memory can be a microprocessor. The source of heat energy can be a laser pulse system in which the laser beam can be directed to individual points of the matrix field on the contact spring, by a mirror that can swivel on two axes. It is also desirable to place an adjustable focusing lens in the path of the heat beam or laser beam. In another embodiment a mirror can be provided on each side of the relay recording device and an adjustable deflection device can be placed in the path of the laser beam or heat beam. This adjustable deflection device can then be used to direct the beam, as desired, onto either mirror. It is desirable for this deflection device to possess a movable prism with metal-coated sides.

In order to insure that the adjustment can be repeated during manufacturing, the irradiated points of the matrix field on the surface of the contact spring must be positioned as accurately as possible. For this purpose, another embodiment of the invention utilizes another measurement laser, in addition to the heat-generating device. This receiver provides, for a specific reflection of the measurement laser beam, a signal to determine the zero point for the deflection device with respect to the relay recording device.

Other features and advantages of the present invention will become apparent from the following detailed description, and from the claims.

For a full understanding of the present invention, reference should now be made to the following detailed description and to the accompanying drawings.

BRIEF DESCRIPTION OF THE DRAWINGS

The invention will be described below in terms of design models, with reference to the following drawings:

FIGS. 2 and 3 are attachments for the static measurement of the contact spring position prior to adjustment.

FIGS. 4, 5 and 6 are schematic representations of the positions of the armature and contact spring when the relay is switched.

FIG. 7 is a side view of a relay with a contact spring that is to be adjusted.

FIGS. 9 and 10 are schematic views of a device to locate the edges of the contact springs to be adjusted.

FIG. 11 is an alternate embodiment of an adjustment apparatus which includes a deflection device and an adjustable focusing device for the laser beam.

DETAILED DESCRIPTION

Figure 1:
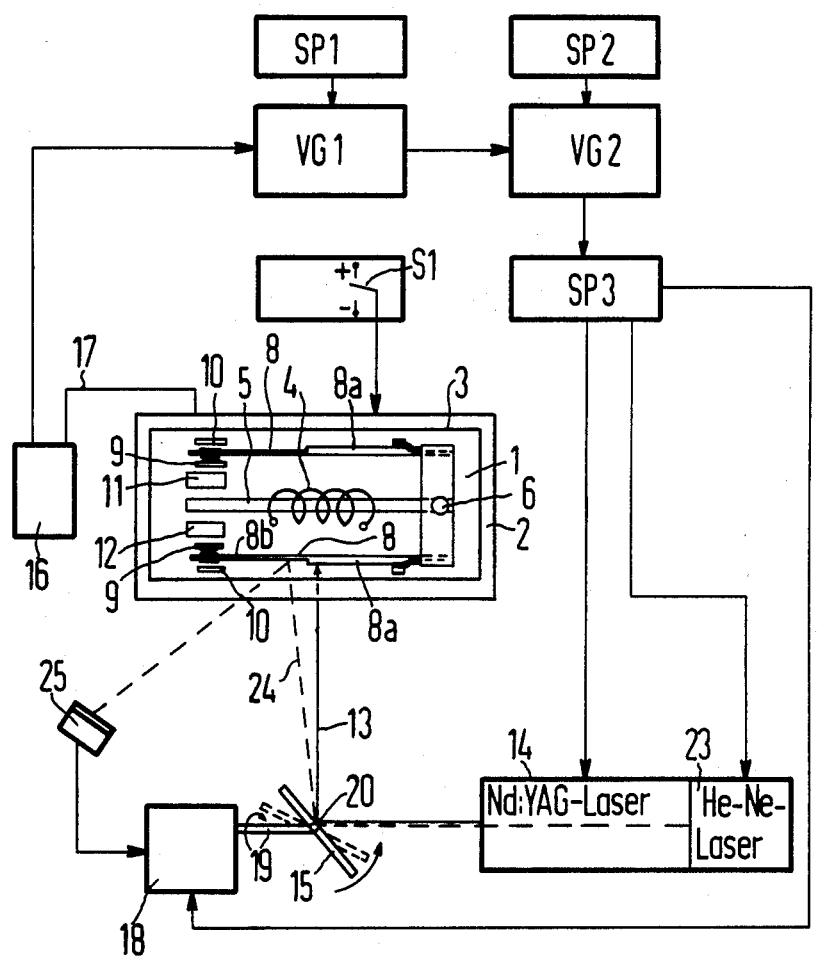
FIG. 1 is a block circuit of an apparatus for the implementation of the adjustment process in accordance with the invention.

Referring to FIG. 1, the arrangement of the individual devices utilized in the adjustment of a relay are shown. Relay 1 is placed on recording device 2, which brings the relay into a precisely predetermined position. Device 2 also possesses apparatus for making contact with the connection pins of the relay. The relay utilized can be constructed in accordance with German patent application No. P 31 32 239.5. In FIG. 1, a top view of relay 1 is shown without its cap, and with the main parts schematically represented. On flat base 3 is a spool (not shown) with a schematically represented winding 4, within which a straight armature 5 is positioned to swivel on pivot pins 6. Pivot pins 6 are fitted to swivel element 7 (shown in FIG. 2), which is rigidly connected to armature 5. Swivel element 7 also has a contact spring 8 on each side of the armature. These contact springs possess a thicker section 8a, which is used for adjustment, and a thinner section 8b which supports a contact element at the free end of the contact spring. When the armature is switched this contact element makes contact, as desired, with either one of opposite contact elements 9 or 10. Armature 5, which is shown in its center position, rests on its final position respectively at either pole 11 or pole 12.

Contact springs 8, which are rigidly connected to the armature by means of a gripping device, must rest at each final position of the armature against the respective opposite contact elements 9 or 10 with a specified stress. Therefore, when the armature is in its center position, the contact springs should also be in the center position between their two opposite contacts. In addition, in order to generate a sufficient contact force the contacts in each case must be closed before the armature has reached its final position. When contact springs 8 deviate from the desired positions, described above, they must be adjusted. This is done with laser pulse 13, which is generated by an Nd:YAG (neodymium:yttrium-aluminum-garnet) laser pulse system 14. The laser beam can be aimed at various points on contact spring 8 by means of deflection mirror 15 which swivels on two axes, as explained below.

To adjust contact springs 8, it is necessary to first measure their deviation with respect to the desired positions. For this purpose, FIG. 1 includes an optical measurement device, for example CCD camer 16, which optically records the position of armature 5 and, if necessary, of contact springs 8, so that their deviation from a desired position can be determined. The recorded image is evaluated in measurement device 16, with the position of the armature or, if necessary, of contact springs 8 being transmitted to comparison device VG1. The positions are then compared with the desired values stored in memory SP1. If the comparison results in a deviation value, then this value is transmitted to second comparison device VG2, where it is compared with correction values that are stored in memory SP2. These correction values are correlated with the respective fixed points of a matrix field, in such a way that when the relevant point on the surface of the contact spring is irradiated, the correlated correction value for the contact spring can be attained. By means of comparison device VG2, points in the matrix field are selected whose correlated correction value has a resultant which at least approximately corresponds to the measured deviation. If the contact springs can be adjusted in one direction only, then care must be taken to see that the correction values do not exceed the amount of the deviation, even when tolerances are taken into account. The matrix points selected are then fed into memory SP3 which is used to control laser 14 and, by means of deflection control 18, deflection device 15. Deflection control 18 causes a rotation of mirror 15 around axis 19 and axis 20, so that laser beam 13 can be aimed in each case at selected points 21 (see FIG. 7) of contact springs 8.

FIG. 7 shows a side view of relay 1 with controllable matrix points 21 in matrix field 22 indicated on a contact spring 8. In this embodiment field 22 consists of a 3×6 matrix of adjustment points 21. A different spring adjustment can be obtained according to the respective distance of the individual adjustment points from the gripping point of contact spring 8.

In order to define a starting position for the control of the individual adjustment points and to make the correction values reproducible for purposes of mass-production, additional pilot laser 23 (shown in FIG. 1) has been provided. This pilot laser is activated prior to the actual adjustment process. By means of deflection mirror 15, beam 24 of adjustment laser 23, which is arranged collinearly with energy laser 14, is swept over the edges of each contact spring 8, and the reflected beam is received and evaluated by light-sensitive diode 25. This allows the position of the outlines of each contact spring to be precisely determined and fed, by means of appropriate signals, into deviation control 18. Starting from a zero position, which corresponds to the outline of each contact spring, deflection mirror 15 can then be aimed exactly at the desired adjustment points. As an alternative, the zero position of the contact spring could also be fed by light receiver 25 into memory SP3, and there converted into the coordinates which define the location of the selected matrix points.

Figure 2:
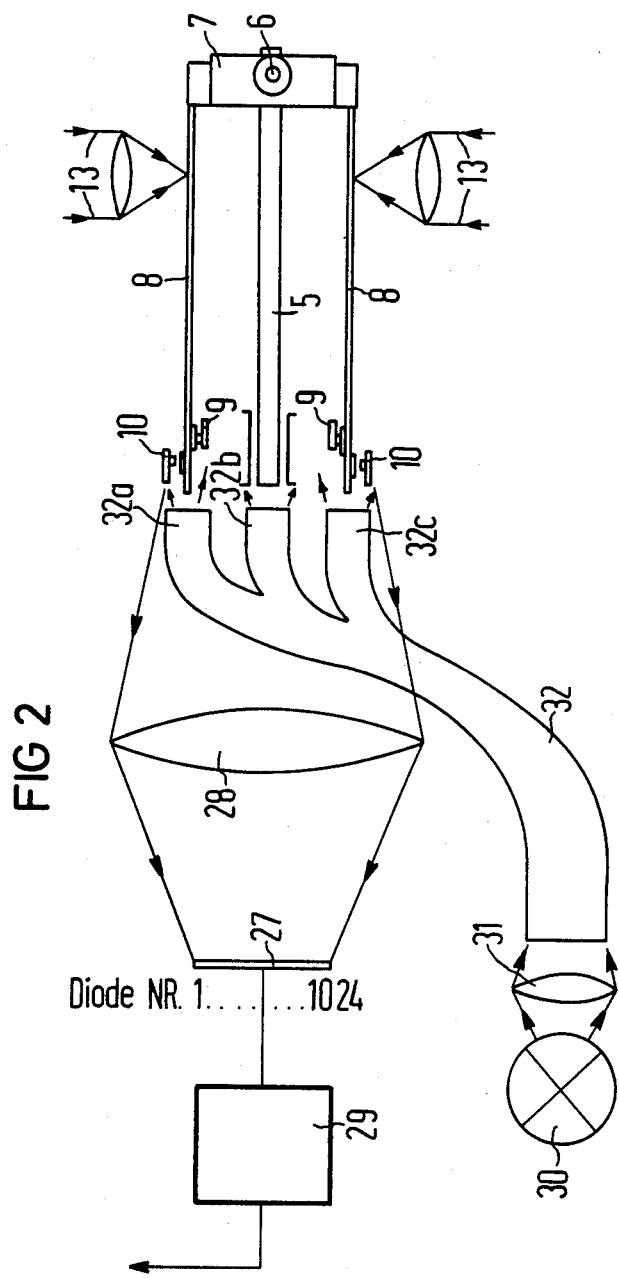

FIG. 2 shows apparatus for the static measurement of the position of each contact spring with the aid of optical measurement device 16.

In this static measurement process, armature 5 is brought into the center position and held there by mechanical or other means. It is then determined whether the contact springs are also in their center position between their respective opposite contact elements 9 and 10 when the armature is held in its center position. For this purpose an optical scan along line 26 (shown in FIG. 3) is made and the resultant optical signal is recorded by a CCD camera. This CCD camera can typically be the commonly used type which includes CCD diode strip 27, objective lens 28 and electronic evaluation device 29.

For measurement purposes, a constant output light from a radiation source 30 (e.g., a controlled cold light source, from LEDs or laser diodes) is used to individually illuminate the two contact systems. This light is locally distributed through lens 31 and optical waveguide bundle 32 or its branching ends 32a, 32b and 32c to the three measurement points. This provides contrast adjustment for the semiconductor camera. The lens system is then used to form an image of the entire measurement area on CCD strip sensor 27. If it turns out from the evaluation that each of the contact springs (as shown, for example, in FIG. 2) are positioned against opposite contact elements 9 when armature 5 is in its center position, then they must be adjusted outward by means of the radiation from laser beam 13, until they are in the center between opposite contact elements 9 and 10.

A particularly advantageous measurement procedure involves switching relay 1, during the measurement process, so that the position of the armature can be measured at the instant when a contact is opened or closed. To perform this dynamic measurement, switch S1 has been included in the arrangement shown in FIG. 1. This switch provides voltage to relay winding 4 of first one and then the other polarity, so that the armature of (polarized) relay 1 is switched once in both directions. When this occurs the switching situation of the contacts can be read into recording device 2 via conductor 17, and transmitted as a signal to camera 16, so that a picture of the relay is taken at the instant when a contact is opened or closed.

The principle of this dynamic measurement is shown schematically in FIGS. 4 to 6. It can be assumed that the relay is constructed as shown in FIGS. 2 and 3. Armature 5 is rigidly connected to one or two center contact springs 8 in the area of its bearing 6, and it can be switched back and forth with its free end 5a between pole plates 11 and 12. FIG. 4 shows the situation when the armature is in one of its end positions, with free end 5a positioned against pole plate 11 and contact 8c, and contact spring 8 is pressed against opposite contact element 9 with the maximum contact force. When this occurs, contact spring 8 is greatly deflected. In this position, the position of armature edge 5b is measured.

When the relay is switched, armature 5 moves away from the return pole piece, and the contact remains closed despite the reduced contact force (FIG. 5). In this situation the center spring is still slightly deflected or bent. As the armature continues to move towards its center position, contact element 8c eventually separates from opposite contact element 9, and an open circuit results. This instant when the open circuit occurs is when another picture is taken. This allows the position of armature edge 5b to again be measured (FIG. 6). From the difference of the two armature positions in FIG. 4 (armature in contact) and FIG. 6 (contacts open), the overtravel is computed and compared with a desired value, and then it is analyzed to determine the correction value.

Figure 8:
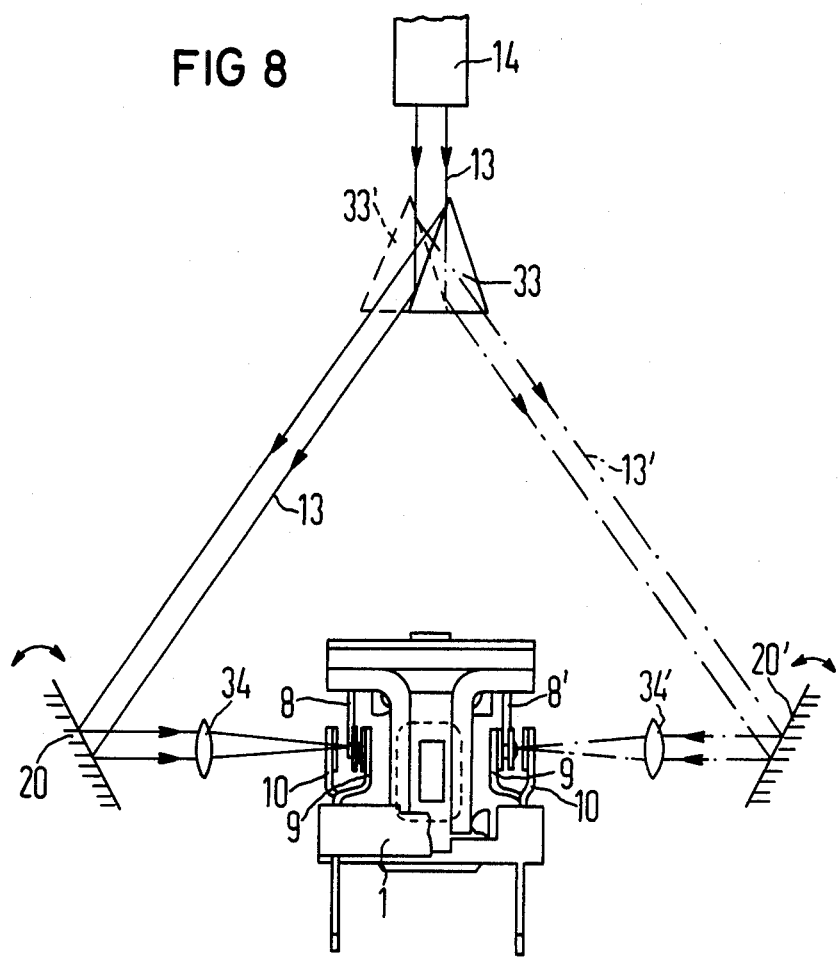
FIG. 8 is a front view of the adjustment device for the relay shown in FIG. 2.

FIG. 8 shows apparatus for the adjustment of contact springs 8 and 8' which are mounted on opposite sides of the relay. Beam 13 from pulse laser 14, is aimed with prism 33, which has metal-coated sides, at mirror 20 which can swivel on two axes. From mirror 20, laser beam 13 is then focused with lens system 34 on the desired adjustment point on contact spring 8. Then, if contact spring 8' is also to be adjusted, prism 33 is moved into position 33', which is shown by the segmented line. Laser beam 13 then strikes the opposite surface and is directed, as adjustment pulse 13', by means of mirror 20' and focusing lens 34' to contact spring 8'. This apparatus allows a single laser pulse 14 to be used to adjust both contact springs 8 and 8'.

Figure 9:
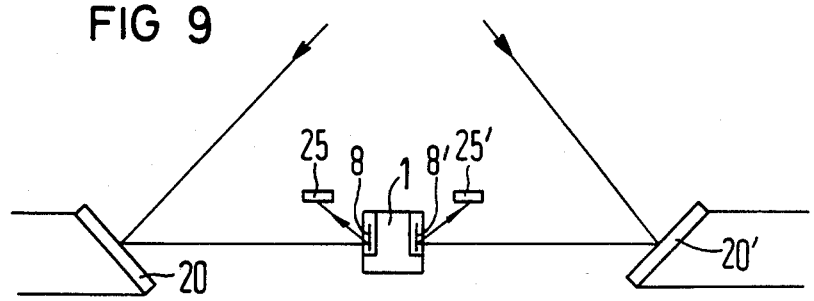

FIG. 9 shows a front view and FIG. 10 a top view of the apparatus for determining the position of relay 1 or of the contact springs, which are to be adjusted. For the position determination, pilot laser 23, typically a helium-neon-laser, is used (FIG. 1). Its laser beam 24 is aimed by prism 33 (FIG. 8), at deflection mirror 20 and at deflection mirror 20'. The beam is then directed first to the left side of the relay, and then to the right side, where it is reflected by contact springs 8 and 8', respectively. In addition, photodiodes 25 and 25' are arranged close to relay 1.

The beam of the helium-neon laser, which runs collinear with the beam of the Nd:YAG pulse laser, is swept off the upper edge of contact springs 8 and 8', respectively prior to the adjustment procedure. The light scattered from this edge is then measured with photodiodes 25 and 25', respectively. The special arrangement of the photodiodes ensures an exact measurement of the beam position with respect to the coordinates of deflection device 15 (FIG. 1).

FIG. 11 is an alternate embodiment of the apparatus shown in FIG. 8, which utilizes an altered deflection device for the laser beams. In this case the collinear beams from lasers 14 and 23 strike deflection mirrors 35a and 35b, which swivel on two axes that are perpendicular to one another. The beams are then sent to one of the two focusing devices 36 and 36'. Each of these focusing devices possesses a lens 37 or 37', which can be adjusted by means of regulating screw 38 or 38'. From the focusing device 36 or 36' the laser beam is directed to deflection mirror 39 or 39', and from there to either relay 1 or a contact spring on one side of the relay. By adjusting lenses 37 and 37', it is possible to change the diameter of the beam striking the surface of the spring and thereby the melt diameter that is produced on the spring. However, once the system is adjusted, the adjusted laser pulse will remain unchanged in terms of pulse energy, pulse length and focus diameter, so that the stored correction values that are based on these parameters can be reproduced for the individual matrix points.

There has thus been shown and described a novel method and apparatus for the adjustment of contact springs in a relay which fulfills all the objects and advantages sought therefor. Many changes, modifications, variations and other uses and applications of the subject invention will, however, become apparent to those skilled in the art after considering this specification which discloses preferred embodiments thereof. All such changes, modifications, variations and other uses and applications which do not depart from the spirit and scope of the invention are deemed to be covered by the invention which is limited only by the claims which follow.

What is claimed is:

1. A method of adjusting contact springs in a relay by the localized application of metered heat from a laser pulse, to produce a specific change in the position of the contact springs, comprising the steps of:
    (a) selecting individual points of a matrix field on the surface of a contact spring;
    (b) irradiating said points with a heat pulse of predetermined energy, length and focus diameter;
    (c) obtaining the correction values for the position of a contact spring when said points are irradiated;
    (d) storing said correction values in a memory;
    (e) measuring the position of said contact spring in comparison to a desired value;
    (f) computing the deviation between said measured value and said desired value;
    (g) comparing said deviation with said stored correction values;
    (h) selecting those correction values whose resultant most closely corresponds to said deviation;
    (i) controlling matrix points on said contact spring surface which correspond to said selected correction values; and
    (j) irradiating said controlled matrix points with a predetermined heat pulse.

2. The method of claim 1, wherein subsequent to irradiating said controlled matrix points, the method further comprises the steps of:
    (a) measuring the position of said contact spring in comparison to a desired position;
    (b) selecting correction values; and
    (c) irradiating points on the surface of said contact spring, said points corresponding to the selected correction values, if said deviation exceeds a predetermined tolerance.

3. The method of claims 1 or 2, wherein controlling said matrix points further comprises, controlling said matrix points with optical deflection of an energy beam generated by a single source of heat.

4. The method according to any of claims 1 or 2, wherein a plurality of contact springs in a relay are controlled by optical deflection of an energy beam generated by a single source of heat.

5. The method according to any of claims 1 or 2, further comprising applying an initial stress to the contact spring at its free end.

6. The method according to any of claims 1 or 2, further comprising recording the positions of the contact spring, its free end and the armature with an electro-optical recording device.

7. The method of claim 6, wherein determining the correction values comprises evaluating the position of the armature at the instant a contact is opened or closed.

8. The method of claim 7, further comprising lighting said armature with a flash at the instant of recording.

9. The method of claim 6, wherein determining the correction values further comprises bringing the armature into its center position, and then determining optically the position of the contact springs with respect to their contact elements.

10. The method according to any of claims 1 or 2, further comprising positioning said heat source or means for said optical deflection, by sensing the contact spring outline with a light beam and a corresponding light receiver.

11. The method of claim 10, wherein sensing the contact spring outline further comprises using a pilot laser which produces a light beam that is collinear with the beam of said heat source, said pilot laser having an energy level that is lower than the energy level of said source.

12. The method according to any of claims 1 or 2, wherein each contact spring has a tapering cross section with a thinner portion at the free end of said spring, comprising irradiating the spring at a thicker portion located closer to the fixed end than the free end.

13. An apparatus for adjusting contact springs in a relay by the localized, metered application of heat, in particular by means of a laser pulse used to produce a specific change in the position of the contact spring, comprising:
(a) a recording device for positioning the relay to be adjusted;
(b) a measurement device for sensing the position of the armature and the contact spring;
(c) an initial comparison device for the comparison of the measured position with the stored desired position, and for the computation of a deviation value;
(d) a correction value memory to record correction values corresponding to specific points of a matrix field;
(e) a second comparison device, to which the computed deviation value and the stored correction values are transmitted;
(f) means for generating a heat radiation pulse; and
(g) means for deflecting said heat radiation pulse, in accordance with the output signals of the second comparison device, at specific points on the contact spring to be adjusted.

14. The apparatus of claim 13, wherein the recording device further comprises a device for contacting the connection pins of the relay.

15. The apparatus of claim 14, further comprising a switch which applies voltage to the excitation winding of the relay.

16. The apparatus of claim 15, wherein the measurement device can be triggered upon the opening or closing of the contact spring to be adjusted.

17. The apparatus according to any of claims 13–16, wherein the measurement device comprises a semiconductor image-recording device in which an image of the area of the relay to be scanned is formed on a CCD strip sensor by a lens system.

18. The apparatus according to claim 13, further comprising a light source and optical waveguide bundles, said light source being directed onto the parts of the relay to be sensed by the optical waveguide bundles during the sensing of the armature and contact spring position by the measurement device.

19. The apparatus according to claim 13, wherein said comparison devices and memories are a microcomputer.

20. The apparatus of claim 13, wherein the means for generating a heat pulse to apply heat to the individual points of the matrix field is a pulse laser system.

21. The apparatus of claim 13, wherein said deflection means is a mirror system which can swivel on two axes, said mirror system useable to direct the beam of the pulse laser system at the individual points of the matrix field.

22. The apparatus according to claim 21, further comprising an adjustable focusing system mounted in the path of the heat beam.

23. The apparatus of claims 21 or 22, further comprising a mirror located on both sides of the recording device, said deflection device at which said laser beam is directed, being capable of aiming said laser beam at either mirror.

24. The apparatus according to claim 23, wherein said deflection means further comprises a movable prism with metal-coated side surfaces.

25. The apparatus according to claim 13, further comprising a pilot laser, said pilot laser providing a beam that is collinear with the heat beam.

26. The apparatus according to any of claims 13 or 25, further comprising at least one light receiver, which at a specified reflection of the measurement laser beam, emits a signal to determine the zero point for the deflection device with respect to the relay recording device.

* * * * *